J. F. CRANSTON.
MACHINE FOR MAKING AND DIPPING MATCHES.
No. 73,507.
Patented Jan. 21, 1868
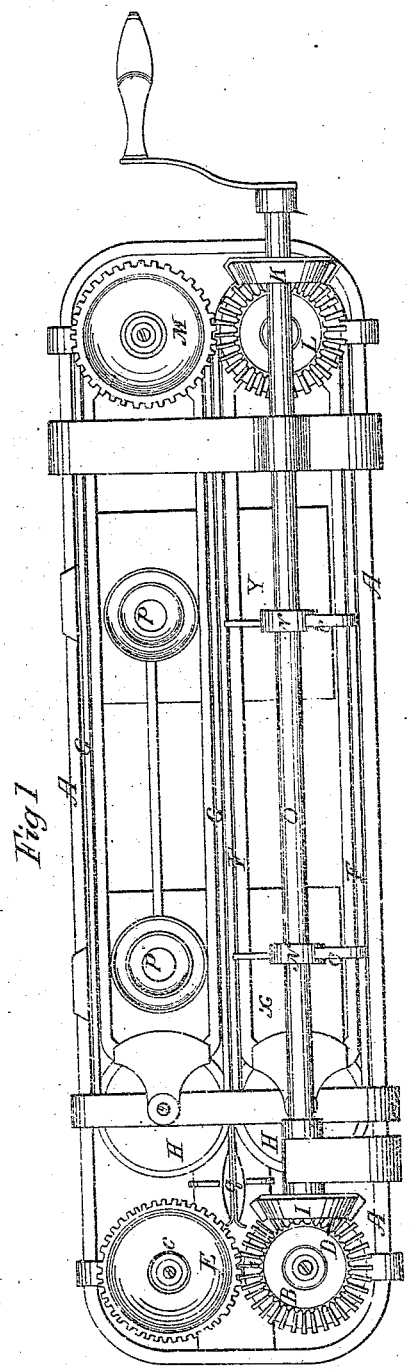
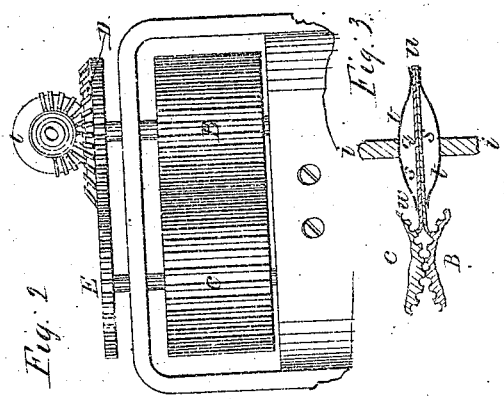
Witnesses:
Inventor:

United States Patent Office.

JAMES F. CRANSTON, OF SPRINGFIELD, MASSACHUSETTS, ASSIGNOR TO HIMSELF AND S. W. PORTER, OF SAME PLACE.

Letters Patent No. 73,507, dated January 21, 1868.

IMPROVEMENT IN MACHINES FOR MAKING AND DIPPING MATCHES.

The Schedule referred to in these Letters Patent and making part of the same.

TO ALL WHOM IT MAY CONCERN:

Be it known that I, J. F. CRANSTON, of Springfield, Hampden county, Commonwealth of Massachusetts, have invented a new and useful Improved Match-Machine; and I do hereby declare that the following is a full and exact description thereof, reference being had to the accompanying drawings, and to the letters of reference marked thereon. In the drawings—

Figure 1 is a plan view,

Figure 2 an end view, and

Figures 3 and 4 detail views of my invention.

This invention consists of an automatic machine for forming matches, dipping, and drying them. It is arranged so that the first operation is to cut out the slips of wood from the stock. It then dips them in sulphur, dries the same, then dips in phosphorus, and delivers the formed match.

In construction, I form my machine as follows: At one end of a table, A, which is formed with a trough for its body, of suitable depth and width, is placed a pair of cutters, B and C, consisting of cylinders set upon vertical shafts, and having corrugated surfaces, the vertical blades of which meet, and separate the stock (which consists of thin pieces of wood, with the grain running vertically) into the stems of the matches. These cylinders B and C are geared together, by gear-wheels D and E, at the top, so as to move in conjunction. One of these gears, D, has bevelled gear on its top edge, the purpose of which I will hereafter explain. After the stock has been cut up, by passing between the cutters B and C, it is passed to two belts, the inner sides of which press against each other. These belts, F and G, work round rollers H and H', on vertical bearings in the middle of the trough of table A. The slips of wood forming the stems of the matches are forced, by the action of the cutters B and C, through a pair of equalizing-springs, $a$, hereafter described, and fed to the belts F and G, which, moving faster than the cutters, carry the stems away from the springs $a$, leaving about the sixteenth of an inch between them. The space beneath the belts is divided equally into three parts, these being the width of the dipping pans $x$ $x$, containing the melted sulphur and phosphorus, and the space between them is for drying the sulphur on the stems after dipping, and before dipping into the phosphorus. As each third of the belt comes over the sulphur-pan, the belt is halted, and the pan rises and dips the ends of the stems at the same time that the phosphorus-pan also rises, and dips with phosphorus the stems that have been dipped in sulphur and dried. The next movement of the belt delivers those that have been dipped in phosphorus, brings those just dipped in sulphur over the drying-compartment, and brings a fresh supply of stems over the sulphur-pan, and so on continually. The whole machine is operated by a horizontal shaft, O, running over the top of the table A, and having at each end a bevelled gear. The one, I, over the cutters, operating them by means of the gear already described, and the one, K, working a similar pair of gears, L and M, at the other end of the table, which operate the belts F and G, the same passing around rollers on the shafts of these gears L and M. Opposite to the centre of each of the dipping-pans are cams N N', on the shaft O, which, at the proper time, lift the dipping-pans by means of hooks $c$ and $c$, extending up from them, these pans being hinged on the other side of the trough. The gears I and K, on the shaft O, have some of their teeth cut off on the same sides, so that when the pans are being lifted to dip the stems, the cutters and the belts are at a stand. The cutters revolve more slowly than the belt-shafts, the gear L, operated by the gear K, having a less number of teeth than the corresponding one on the cutters. In order to keep the dipping-pans supplied constantly with a quantity of melted sulphur and phosphorus, I arrange a melting-apparatus, which is warmed by steam, and consists of two cups, P and P, one of which contains sulphur and the other phosphorus. Steam is passed around these cups, and around the pipes connecting them with the dipping-pans. A section of one of these is shown in fig. 4, where the cup P has the pipe $p$ extending downwards from it, this pipe communicating with the dipping-pan below, and supplying it with melted sulphur or phosphorus as fast as it is fused by the steam which surrounds it, between it and the outer case $q$. Steam may be admitted into a common pipe, $r$, communicating with both cases $q$. In fig. 3 is shown the arrangement of the equalising-springs, for conveying or guiding the match-stems from the cutters to the belts. In construction, they are formed of two centre parallel pieces, $s$ and $s'$, which are pressed together by spring-pieces $t$ and $t'$, which are fastened at one end to the pieces $s$, at $u$. The pieces $t$ and $t'$ are attached to supports $v$ and $v'$ at their outside curves; and when the pieces $s$ and $s'$ are opened apart, the ends of the springs, at $u$, not being fastened to the centre pieces, play upon their outside surfaces. This arrangement gives an equalizing pressure to the centre pieces, and holds each stem securely in whatever part of the spring it may be pushed. The knives upon the cutters may be arranged so as to form whatever size or shape of stem for the match may be desirable.

The advantages of this machine are in the perfectly automatic arrangement of the parts, by which the match is cut out, dipped in both sulphur and phosphorus, dried, and delivered, and in the simplicity of the parts and operation of the whole.

Now, having described my invention, what I claim as new, and desire to secure by Letters Patent, is—

1. The arrangement of the cutters C and B, belts F and G, and dipping-pans X and Y, having the melting-cups T and P, operated in connection with each other by the horizontal shaft O, substantially as and for the purpose described.

2. The device for the purpose of transferring the match-stems from the cutters C and B to the belts F and G, consisting of the springs $t$ and $t'$ and guides $s$ and $s'$, constructed and arranged as described.

JAMES F. CRANSTON.

Witnesses:
E. H. HYDE,
J. B. GARDINER.